G. W. SMITH.
FACE MILL GRINDER.
APPLICATION FILED SEPT. 2, 1911.
1,039,075.
Patented Sept. 17, 1912.
4 SHEETS—SHEET 1.
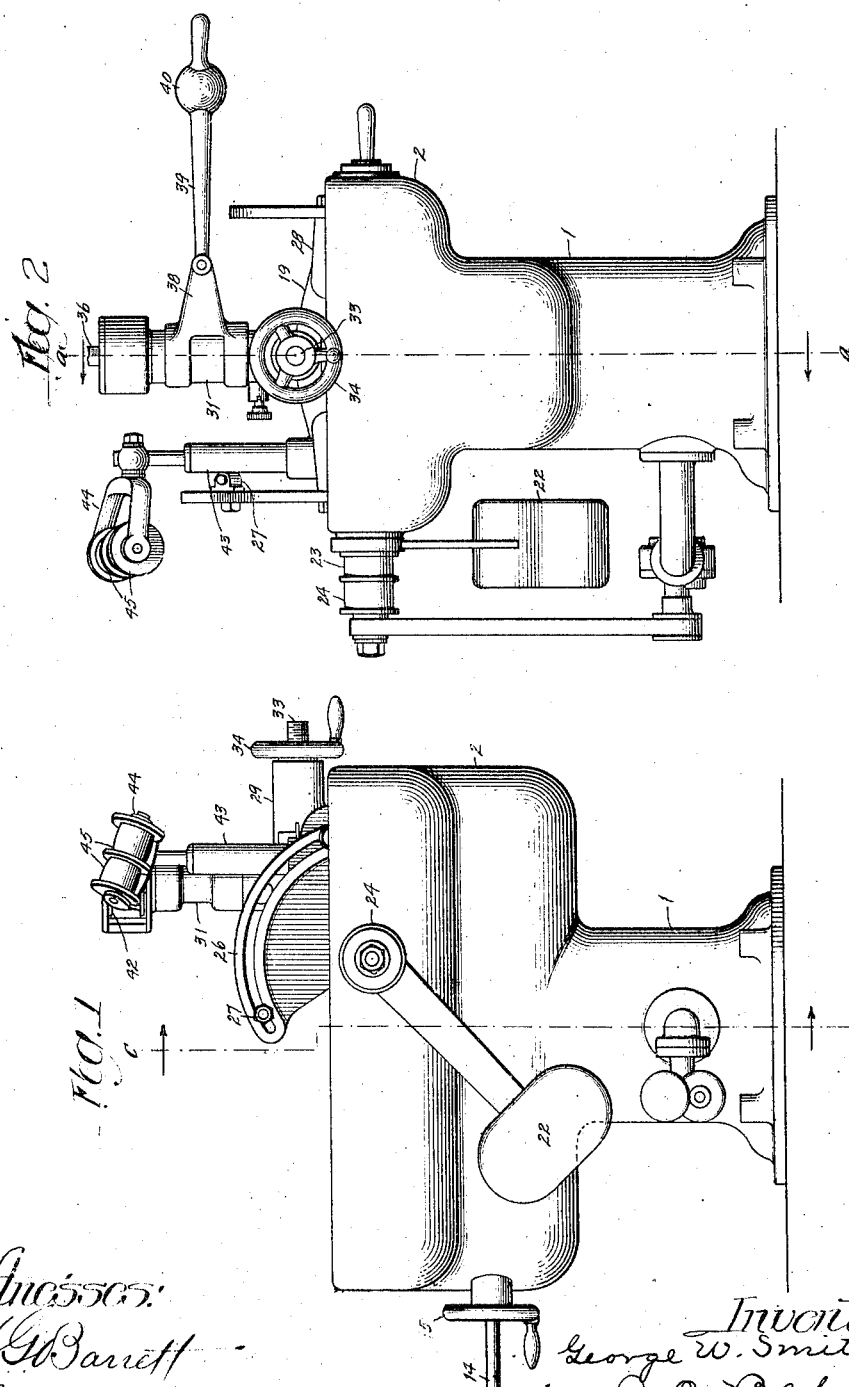

G. W. SMITH.
FACE MILL GRINDER.
APPLICATION FILED SEPT. 2, 1911.

1,039,075.

Patented Sept. 17, 1912.
4 SHEETS—SHEET 2.

Witnesses:

Inventor:
George W. Smith
by A. O. Behel
Atty.

G. W. SMITH.
FACE MILL GRINDER.
APPLICATION FILED SEPT. 2, 1911.

1,039,075.

Patented Sept. 17, 1912.

4 SHEETS—SHEET 3.

G. W. SMITH.
FACE MILL GRINDER.
APPLICATION FILED SEPT. 2, 1911.

1,039,075.

Patented Sept. 17, 1912.

4 SHEETS—SHEET 4.

UNITED STATES PATENT OFFICE.

GEORGE W. SMITH, OF ROCKFORD, ILLINOIS, ASSIGNOR TO THE INGERSOLL MILLING MACHINE COMPANY, OF ROCKFORD, ILLINOIS, A CORPORATION OF ILLINOIS.

FACE-MILL GRINDER.

1,039,075. Specification of Letters Patent. Patented Sept. 17, 1912.

Application filed September 2, 1911. Serial No. 647,233.

*To all whom it may concern:*

Be it known that I, GEORGE W. SMITH, a citizen of the United States, residing at Rockford, in the county of Winnebago and State of Illinois, have invented certain new and useful Improvements in Face-Mill Grinders, of which the following is a specification.

The object of this invention is to construct a rotatable grinding wheel so that it may have a swinging movement in order to grind ground nosed cutters.

Figure 3:
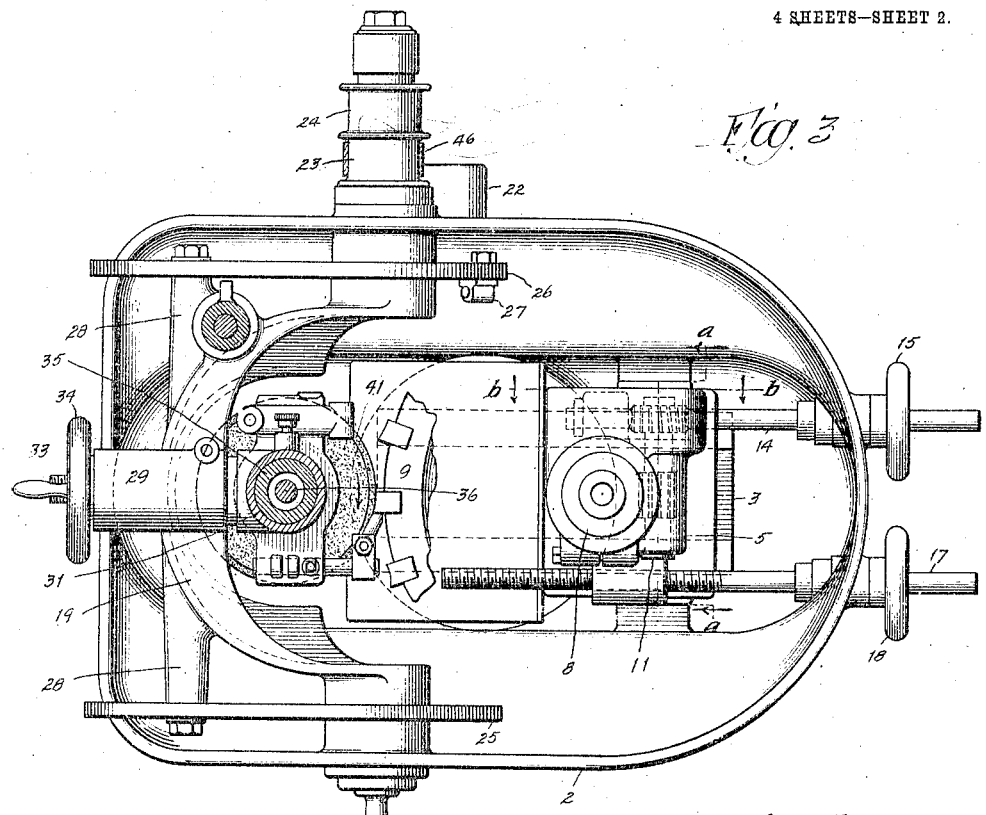
Figure 4:
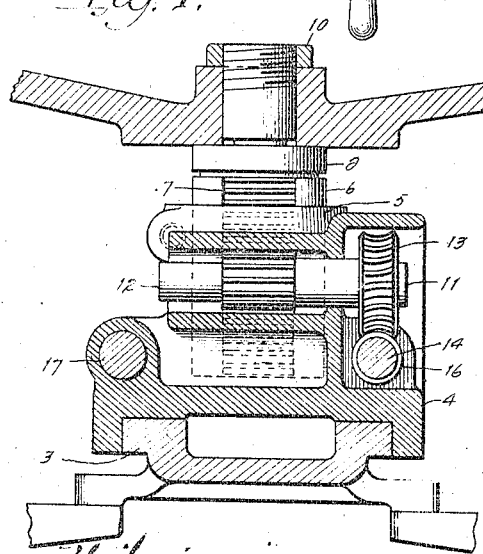
Figure 5:
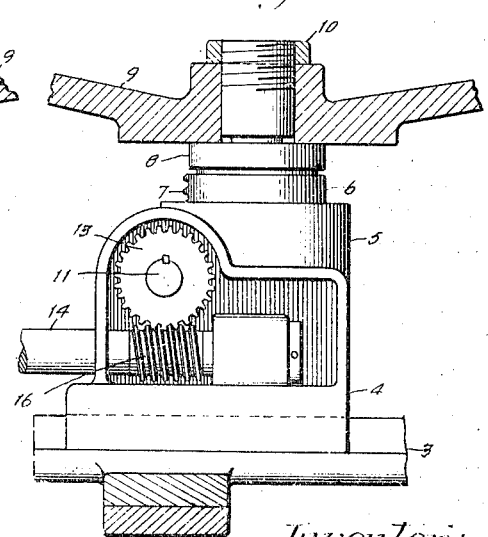
Figure 6:
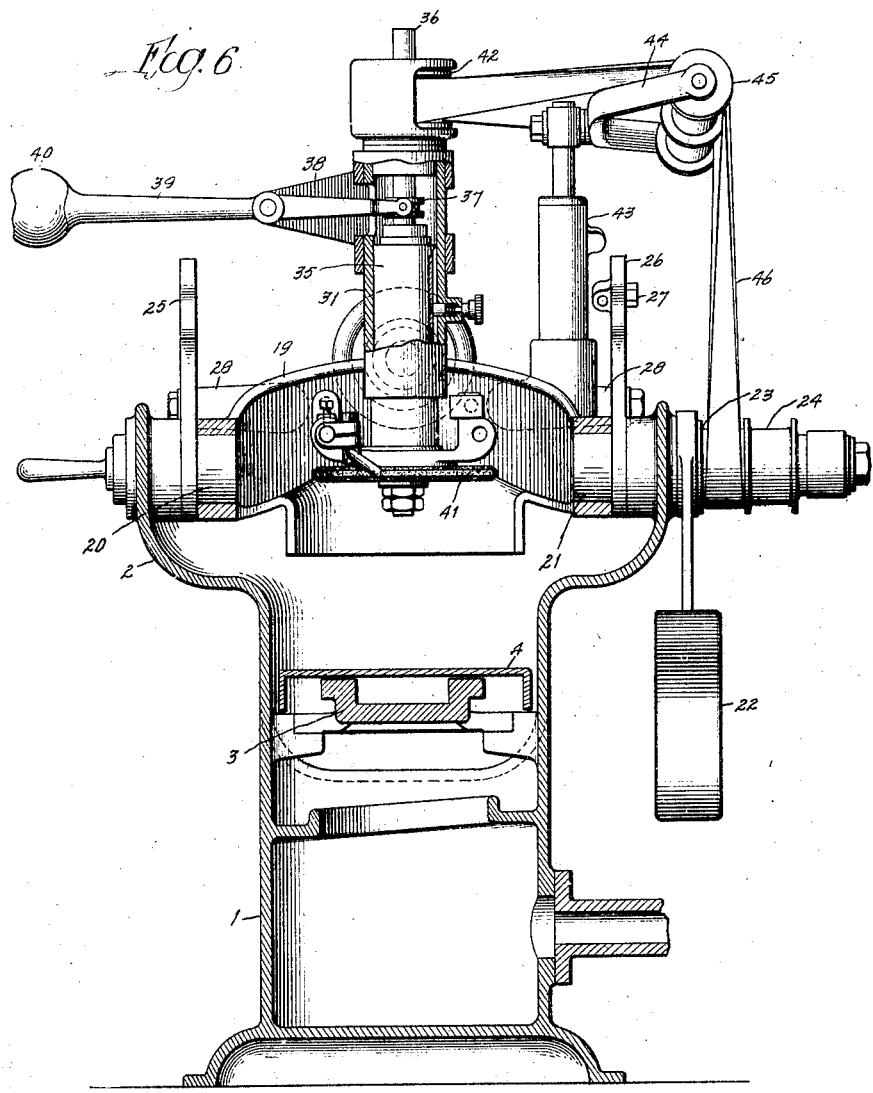
Figure 7:
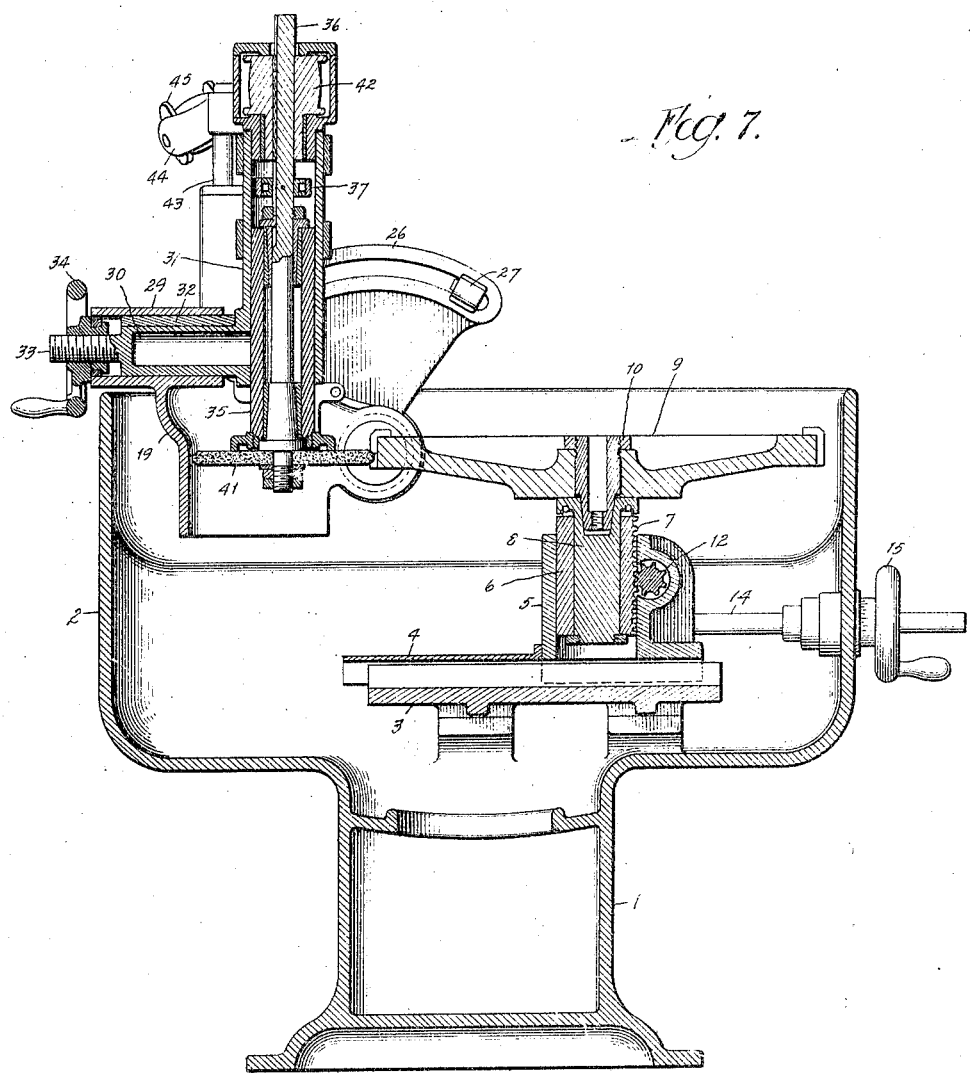

In the accompanying drawings, Figure 1 is a side elevation. Fig. 2 is a rear elevation. Fig. 3 is a plan view. Fig. 4 is a section on line *a a* Fig. 3. Fig. 5 is a section on line *b b* Fig. 3. Fig. 6 is a section on line *c c* Fig. 1. Fig. 7 is a section on line *d d* Fig. 2.

The reservoir base comprises the pedestal portion 1 and the upper section 2 within which are located the mechanical parts of the grinder. Within the upper section of the reservoir is located a guide-way 3 which supports a guide 4. From this guide extends vertically a tubular section 5 within which is located a sleeve 6 provided with a rack 7. Within the sleeve 6 is located a cutter holder 8 capable of a rotary turning movement. A cutter 9 is supported by the holder 8 and clamped in position by the nut 10. A cross-shaft 11 is supported by the tubular section 5, and to this shaft are connected a spur-gear 12 which meshes with the rack 7, and a worm-wheel 13. A shaft 14 extends through the wall of the upper section 2 of the reservoir and is rotated by the hand-wheel 15. To this shaft is secured a worm 16 which meshes with the worm-wheel 13. By turning the hand-wheel 15 the worm 16 will be rotated, and a rotary movement will be imparted to the spur-gear 12, which will impart a reciprocating movement to the section 5, and the cutter 9 carried by it.

A screw-shaft 17 is held against lengthwise movement by the wall of the upper section 2 of the reservoir and is rotated by the hand-wheel 18. This screw-shaft has a screw connection with the guide 4 and by rotating it, the guide can be reciprocated in connection with the guide-ways 3, which will move the cutter 9 bodily.

A yoke 19 is located within the upper section of the reservoir and is supported on a stud 20 at one end and connected to a rock-shaft 21 at its other end Fig. 6. To this rock-shaft is secured a counterbalance weight 22. Double pulleys 23 and 24 are supported loosely on the rock-shaft 21. Two slotted quadrants 25 and 26 are supported by the stud 20 and rock-shaft 21, and the wall of the upper section of the reservoir. A stop 27 is adjustably connected with the quadrant 26.

From the yoke 19 extend two branches 28 which are guided in the slots of the two quadrants 25 and 26, and the branch guided in the quadrant 26 will contact with the stop 27.

From the center portion of the yoke extends a tubular section 29 within which is located a slidable projection 30 extending from the tubular section 31. This projection 30 is held against axial movement by the key 32. From this projection 30 extends a screw-threaded stud 33 with which a hand-wheel 34 has a connection. This hand-wheel is held against an outwardly bodily movement but capable of revolving, which movement will move the slide and projection 30 in the tubular section 29.

Within the tubular section 31 is located a slidable sleeve 35, constituting a carrier for a rotary grinding wheel and within this sleeve is located a rotatable spindle 36. To the spindle 36 is pinned a collar 37.

From the upper portion of the tubular section 31 extend two arms 38 between which is pivoted a lever 39 having one end connected to the collar 37, and its other end provided with a weight 40 to counterbalance the weight of the sleeve 35, spindle 36 and a grinding-wheel 41 secured to the lower end of the spindle. A pulley 42 is supported by the upper end of the tubular section 31, and its spindle 36 has a sliding engagement with the pulley.

From the yoke 19 extends a support 43, and to the upper end of which is connected a fork 44 which supports two idle pulleys 45. A belt 46 passes around the pulley 32, the idlers 45, and the pulley 42. The pulley 24 is rotated by a belt connection with a prime mover which will rotate the pulley 23, and through the belt 46, the pulley 42 will be rotated, and it will rotate the spindle 36 carrying the grinding-wheel 41.

By means of the lever 39, the grinding-wheel can be raised and lowered across the face of the cutter head 9 while it is being ground.

By rocking the yoke 19 the grinding-wheel will grind a round nosed cutter.

By means of the hand-wheel 15 the cutter head can be raised or lowered to present it properly to the grinding-wheel.

By turning the hand-wheel 18, various sized cutter heads can be ground.

I claim as my invention.

1. In a machine of the character set forth, the combination with a base, of a work holder mounted thereon, a swinging support, a rotary grinding member journaled in the swinging support, means for swinging the support, and means for continuously rotating the grinding member during such swinging movement.

2. In a machine of the character set forth, the combination with a base, of a work holder mounted thereon, a swinging support on the base, a reciprocatory carrier mounted on the swinging support, a rotary grinding member journaled in the carrier, and means for rotating the carrier irrespective of the swinging of the support and the reciprocation of the carrier.

3. In a machine of the character set forth, the combination with a base, of a work holder mounted thereon, a yoke pivoted on the base, a sleeve movable in the yoke, a shaft journaled in the sleeve and carrying a grinding member, means for swinging the support and reciprocating the sleeve, and means for rotating the shaft during such movement.

4. In a machine of the character set forth, the combination with a base comprising a receptacle, of a work holder mounted in the receptacle, a swinging yoke journaled in the receptacle, means for limiting the swinging movement of the yoke, a reciprocatory sleeve mounted in the yoke, means mounted in the yoke for reciprocating the sleeve, a shaft journaled in the sleeve, and carrying a grinding member, and means for rotating the grinding member during the movement of the yoke and sleeve.

5. In a machine of the character set forth, the combination with a base comprising a receptacle, of an adjustable work holder mounted in the receptacle, a yoke pivotally mounted in the receptacle, an adjustable stop for limiting the swinging movement of the yoke, a reciprocatory sleeve mounted in the yoke, a shaft journaled in the sleeve, means mounted on the yoke and engaged with the shaft for reciprocating the same and the sleeve, a grinding member carried by the lower end of the shaft and operating on the work, a pulley mounted on the yoke and engaged with the shaft, and means for driving the pulley.

6. In a machine of the character set forth, the combination with a base, of a swinging support pivoted thereto, a carrier sleeve transversely adjustable on the support, a rotary grinding member journaled in the sleeve, and means for holding the work in position to be operated on by the grinding member.

7. In a machine of the character set forth, the combination with a base, of a swinging support pivotally mounted thereon, a carrier transversely and longitudinally adjustable on the swinging support, a rotary grinding member journaled in the carrier and adjustable therewith, means for rotating the grinding member irrespective of its adjustment, and means for holding the work in position to be operated on by the grinding member.

8. In a machine of the character set forth, the combination with a base comprising a receptacle, of a work holder adjustably mounted in the receptacle, a yoke pivoted in the receptacle, a carrier sleeve transversely and longitudinally adjustable on the yoke, means for transversely adjusting the sleeve, means for moving the sleeve longitudinally, a shaft journaled in the sleeve and carrying at one end a grinding member, and means engaged with the shaft for rotating the same.

9. In a machine of the character set forth, the combination with a base, of a swinging support, a rotatable grinding member journaled in the support, and means for continuously rotating the member, including a rotatable driving device having its axis of rotation substantially coincident with the pivot axis of the swinging support.

10. In a machine of the character set forth, the combination with a base, of a swinging support mounted thereon and including a pivot, a rotatable grinding member journaled on the swinging support, and means for continuously rotating the member, including a rotatable driving pulley journaled on the pivot, and a belt from the pulley to the grinding member.

11. In a machine of the character set forth, the combination with a base comprising a receptacle, of an adjustable work support located therein, a swinging support pivotally mounted in the receptacle and including a pivot projecting therefrom, a rotatable grinding member journaled on the support and extending down into the receptacle, a pulley engaged with the upper portion of the grinding member, a pulley journaled on the projecting portion of the pivot, and a belt connection between the pulleys.

12. In a machine of the character set forth, the combination with a base, of a horizontally and vertically movable work holder mounted on the base, means for adjusting and securing the work holder, a swinging and reciprocating grinding member coöperating with the work holder, and means for swinging and reciprocating said grinding member.

13. In a machine of the character set forth, the combination with a base, comprising a receptacle, a guideway therein, a carriage movable in the guideway, a work holder vertically movable on the carriage, and a rotary grinding member journaled in the receptacle and operating on work placed on the work holder.

14. In a machine of the character set forth, the combination with a base comprising an open topped receptacle having a guideway therein, a carriage horizontally movable on the guideway, means for projecting through one wall of the receptacle for moving the carriage, a vertically movable work holder mounted on the carriage, means projecting from the receptacle for vertically moving the work holder, a grinding member adjustably mounted on the receptacle and having portions projecting above the same, and driving means operating on the projecting portions of the grinding member.

In testimony whereof I have hereunto set my hand in presence of two subscribing witnesses.

GEORGE W. SMITH.

Witnesses:
A. O. BEHEL,
E. D. E. N. BEHEL.